A. SHEPARD.
COFFEE-MILLS.
No. 186,889. Patented Jan. 30, 1877.
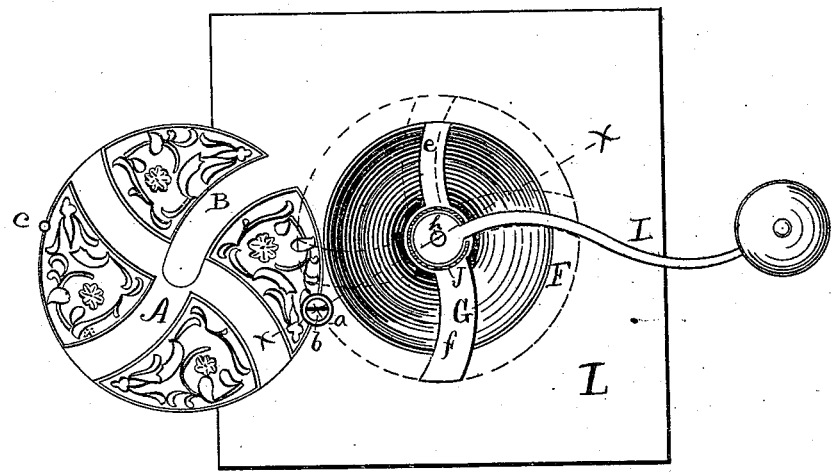
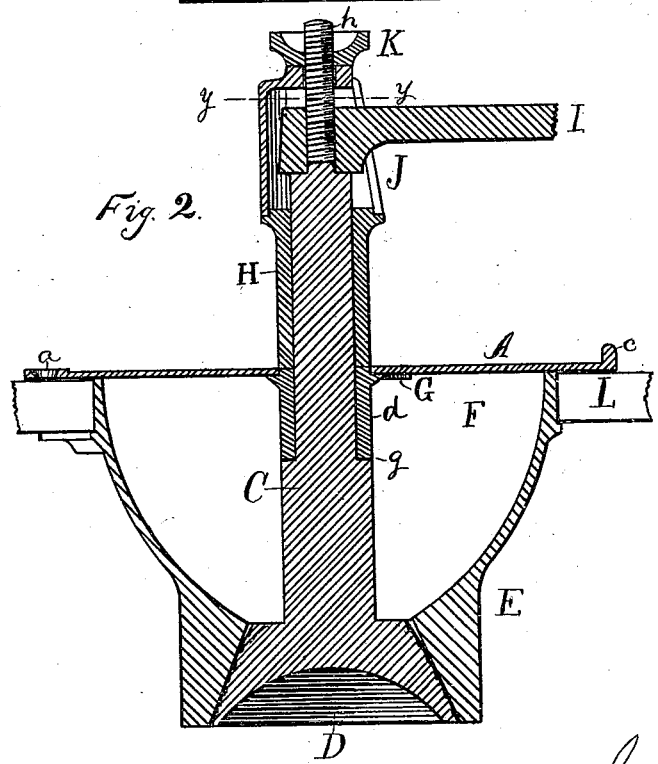
Witnesses
H. K. Gale.
L. S. Burr
Inventor
Amos Shepard
By James Shepard Atty

A. SHEPARD.
COFFEE-MILLS.
No. 186,889. Patented Jan. 30, 1877.
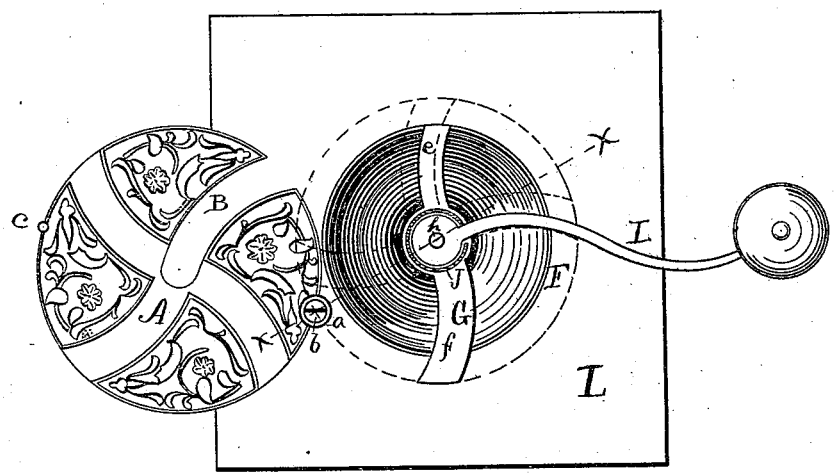
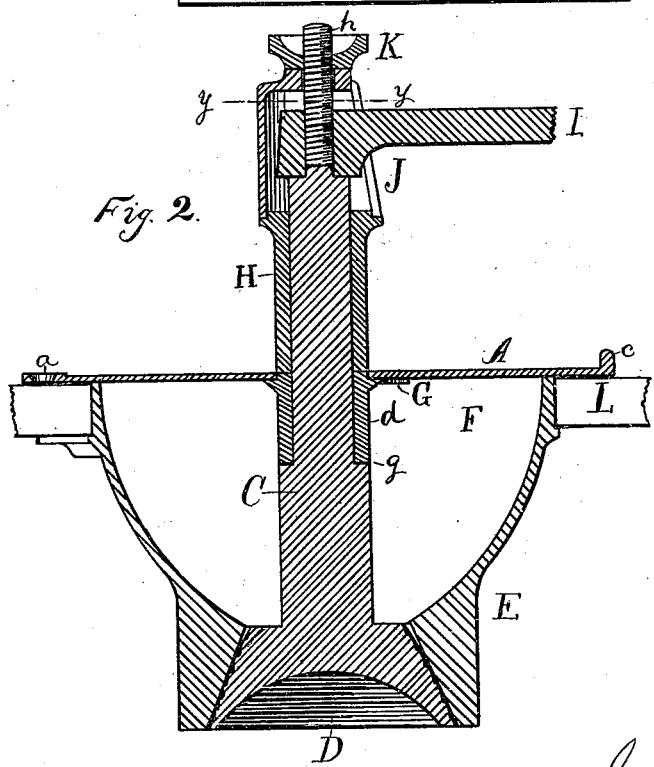

UNITED STATES PATENT OFFICE.

AMOS SHEPARD, OF SOUTHINGTON, CONNECTICUT.

IMPROVEMENT IN COFFEE-MILLS.

Specification forming part of Letters Patent No. 186,889, dated January 30, 1877; application filed November 23, 1876.

*To all whom it may concern:*

Be it known that I, AMOS SHEPARD, of Southington, in the county of Hartford and State of Connecticut, have invented certain new and useful Improvements in Coffee and Spice Mills, of which the following is a specification:

My invention consists of the peculiar construction of the cover, the cross-bar, in which is the bearing for the shank of the grinding-nut, and the mechanism for adjusting and regulating the grinding-nut, all as hereinafter described.

In the accompanying drawing, Figure 1 is a top view, partly in horizontal section, of a grinding-mill which embodies my invention, the same being represented with the hopper uncovered; and Fig. 2 is a vertical section of the same on line $x\ x$ of Fig. 1, but represented with the hopper closed by the cover.

The cover A is disk-shaped, and provided at one side with a bearing, $a$, for a screw or pivot, $b$, said bearing preferably being formed in a small extension, as shown. Opposite the bearing $a$ is a knob or handle, $c$, for convenience of grasping to swing the cover. A curved slot, B, Fig. 1, is formed in the cover A, concentrically with the pivot-bearing $a$, and of a size and depth that will receive the shank C of the grinding-nut D, and allow the cover to be placed concentrically over the said nut, its grinding-shell E, and hopper F. The cross-bar G, upon which is formed the bearing $d$ of the shank C, has one end $e$ flush with the top of the hopper F, and the opposite end $f$ is elevated above the top of the hopper F a distance about equal to the thickness of the cover A, which elevation must also be curved, to correspond with the concentric slot in the cover. The hopper and its cross-bar, the grinding-shell, and nut are secured in any proper manner to a suitable box, of which L represents the top. The cover A is then placed concentrically over the hopper, and the screw $b$ inserted through the bearing $a$ into the top L, which screw then becomes a pivot for the cover to swing on. In this position the hopper is closed, as shown in Fig. 2, and indicated by broken lines in Fig. 1; but by taking hold of the handle $c$ and swinging the cover on its pivot it may be swung to one side, as shown in Fig. 1, and the whole top of the hopper left uncovered. In thus swinging the cover to one side, the sides of the curved slot each describe a partial circle, of which the pivot $b$ is the center, whereby the correspondingly-curved elevation of the cross-bar and the shank of the grinding-nut offer no obstruction to the swinging movement of the cover. Upon the shank C of the grinding-nut D I form a shoulder, $g$, (see Fig. 2,) which, when the nut is raised so as to fill closely the grinding-shell E, for fine grinding, as shown in Fig. 2, will abut against the lower end of the bearing $d$, and prevent the nut being forced farther into the shell, to the injury of the grinding-teeth. Surrounding the shank C, above the bearing $d$, is a collar, H, and above this is an ordinary crank, I, either screwed on or otherwise properly fastened. Surrounding the head of the crank I is a slotted and chambered collar, J, the slot being for the purpose of receiving the crank and allowing it to pass out of the collar, as shown in the central portion of Fig. 1, which is a horizontal section on line $y\ y$ of Fig. 2; and it is chambered to receive the head of the crank, and allow it to move up and down within the chamber whenever the grinding-nut is adjusted. The arm of the crank, extending outward through this slotted collar, also insures the rotation of said collar with the crank and grinding-nut, for a purpose hereinafter specified. A central screw, $h$, of the shank C extends upward through the collar J, and on this screw is the adjusting-nut K. By unscrewing the nut K the grinding-nut C may be lowered for coarser grinding; and as the collar J, as before stated, necessarily rotates with the crank, there will be no liability of the adjusting-nut to move so as to change the adjustment. By making two collars, H J, only a short slot for the crank is necessary, and the head of the crank is covered. The adjusting-nut surmounts the complete device, thereby bringing it into the most convenient position for adjusting, and central, so as to move concentrically with the crank, while the parts are so simple in construction as to render the device both convenient and inexpensive.

I claim as my invention—

1. The swinging cover A, provided with a pivot-bearing and a curved slot made concentric with said bearing, substantially as described, and for the purpose set forth.

2. The cover A, provided with a pivot-bearing, and a curved slot made concentric with said bearing, in combination with a correspondingly-curved portion of the cross-bar G, substantially as described.

3. In a grinding-mill, the slotted and chambered collar J, receiving and covering the head of the crank, and allowing it to move up and down within said chamber, substantially as described.

4. The slotted and chambered collar J, crank I, passing through the slot of the collar, and having its head within the chamber of said collar, in combination with the grinding-nut, shank, and screw D C h, loose collar H, and adjusting-nut K, surmounting the whole, substantially as described.

AMOS SHEPARD.

Witnesses:
SAMUEL E. COWLES,
CHARLES D. BARNES.